H. KROG, Sr.
Plow.
No. 166,281.
Patented Aug. 3, 1875.
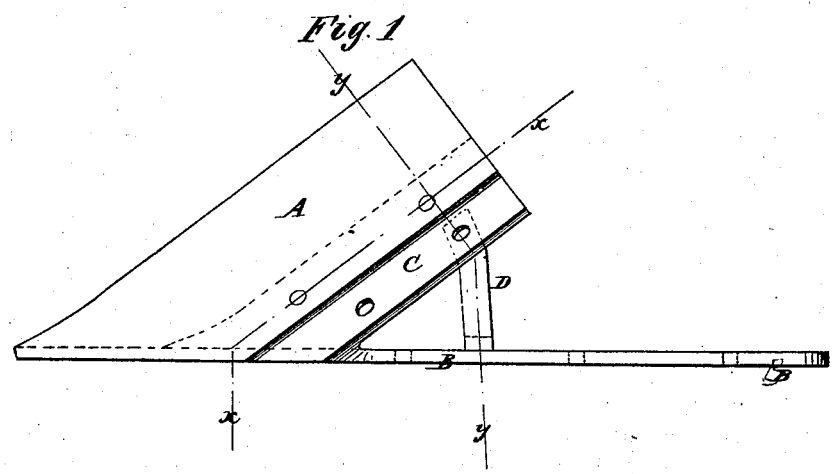
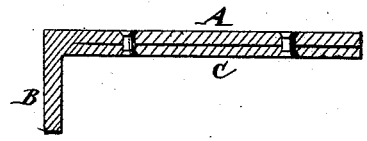
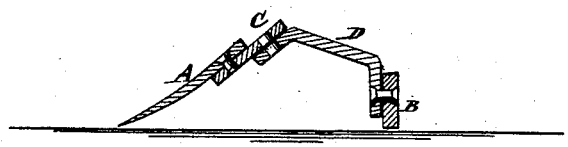
WITNESSES:
A. W. Almqvist
A. F. Terry
INVENTOR:
H. Krog, Sr.
BY
ATTORNEYS.

UNITED STATES PATENT OFFICE.

HENRY KROG, SR., OF WASHINGTON, MISSOURI.

IMPROVEMENT IN PLOWS.

Specification forming part of Letters Patent No. 166,281, dated August 3, 1875; application filed May 22, 1875.

*To all whom it may concern:*

Be it known that I, HENRY KROG, Sr., of Washington, in the county of Franklin and State of Missouri, have invented a new and useful Improvement in Plows, of which the following is a specification:

Figure 1 is a top view of a plowshare and bar to which my improvement has been applied. Fig. 2 is a detail section of the same, taken through the line *x x*, Fig. 1. Fig. 3 is a detail section of the same taken through the line *y y*, Fig. 1.

Similar letters of reference indicate corresponding parts.

The invention will first be described, in connection with drawing, and then pointed out in the claim.

A is the share. B is the bar, and C is a plate placed beneath the upper edge of the share A to receive the lower edge of the mold-board, which rests against the upper edge of the share A. The inner end of the plate C is welded to the forward end of the bar B, and the inner end of the share A is welded to the inner end of the plate C and to the forward end of the bar B, so that the adjacent ends of the three parts, A B C, are all solidly connected with each other. The wing of the share A is secured to the plate C by rivets, as shown in Figs. 1, 2, and 3. The upper part of the plate C has holes formed in it to receive the screws or bolts by which the mold-board is secured to said plate. The outer parts of the share A and plate C are supported by a brace, D, the outer end of which is secured by the outer screw or bolt that secures the mold-board to said plate C. The inner end of the brace D is riveted to the bar B. By this construction the parts A B C will be strongly and firmly connected together, producing a much more durable plow than when made in the ordinary way.

Having thus described my invention, I claim as new and desire to secure by Letters Patent—

In a plow, the combination of share A, landside-bar B, and seat C, the connecting ends of these parts being welded together, while the outer ends of plates A C are riveted or bolted together, all substantially as and for the purpose specified.

HENRY KROG, SR.

Witnesses:
 TH. W. WEEKS,
 ANDR. GRUNSWOLD,
 ERNST BOJOS.